Patented Oct. 16, 1934

1,977,440

UNITED STATES PATENT OFFICE 1,977,440

MANUFACTURE OF LEAD SULPHOCYANIDE

Charles Roberts Harris, Niagara Falls, N. Y., assignor to The E. I. du Pont de Nemours & Company, Incorporated, Wilmington, Del., a corporation of Delaware No Drawing. Application February 17, 1933, Serial No. 657,263

9 Claims. (Cl. 23—75)

This invention relates to the manufacture of lead sulphocyanide, and more particularly to an improved method for producing lead sulphocyanide of a high degree of purity, suitable for the requirements of the ammunition industry.

Lead sulphocyanide, which is to be used as an ingredient in priming compositions for cartridges and the like, is required to meet very rigid specifications as to purity and color. The United States Army Ordnance Department specifications require that the material contain not less than 99.3% of lead sulphocyanide, and that the color be pure white to light yellow.

Lead sulphocyanide is ordinarily prepared by the interaction of a solution of an alkali metal or ammonium sulphocyanide with a solution of a lead salt. In the methods previously followed in carrying out this process, it was necessary to use very pure and relatively expensive raw materials in order to obtain a product of the high purity and light color demanded by ammunition manufacturers. It was found, for example, that the solutions of sodium sulphocyanide which may be made conveniently on a commercial scale by the direct combination of sulphur with sodium cyanide solutions, when used for the manufacture of lead sulphocyanide, would yield a product of dark color and low purity.

An object of my invention is to provide a method for the manufacture of lead sulphocyanide of a high degree of purity, characterized by the fact that alkali metal or ammonium sulphocyanide solutions of a relatively impure nature, such as may be conveniently and inexpensively prepared on a commercial scale, may be utilized. A further object is to utilize such impure sulphocyanides to produce a lead sulphocyanide having a light color. Other objects will be hereinafter apparent.

I have determined the particular manner in which certain impurities which normally exist in the above mentioned sulphocyanide solutions affect the purity and color of the product. I have discovered that ferrocyanides, when present even in very small amounts, impart a strong yellow coloration to the product, in spite of the fact that lead ferrocyanide itself is colorless. When carbonates are present, lead carbonate is precipitated along with the lead sulphocyanide, resulting in a corresponding decrease in the purity of the product. Sulphides have a similar action, and, in addition, cause discoloration of the product.

According to my invention, ferrocyanides and other harmful impurities are removed from the crude alkali metal or ammonium sulphocyanide solution previous to the precipitation of the lead sulphocyanide, whereby the latter is obtained in a pure form, having little or no color.

In one method of carrying out my invention, I purify the crude solution of alkali metal or ammonium sulphocyanide by adding thereto suitable amounts of salts of metals whose respective sulphides, ferrocyanides, and carbonates are relatively insoluble in the said sulphocyanide solutions; whereupon the said insoluble metal sulphides, ferrocyanides, and carbonates may be removed by filtration or other suitable means. The resulting purified alkali sulphocyanide solution is then brought to a condition of slight acidity and lead sulphocyanide is precipitated therefrom by the addition of a solution of a salt of lead. The precipitated lead sulphocyanide is then separated from the mother liquor by filtration or other suitable means; the crystals are washed free of soluble impurities and dried at temperatures below 220° F. A preferred method of carrying out my invention is illustrated by the following example:

Example

A solution of sodium sulphocyanide containing 25% to 30% of NaSCN is prepared in a known manner by the reaction of sulphur with a solution of sodium cyanide. Such sodium sulphocyanide solution will ordinarily contain 1% to 2% of sodium carbonate and relatively smaller amounts of sodium sulphide and sodium ferrocyanide. To this solution is added a solution of lead nitrate in successive small portions until any further additions produce no black precipitate in a filtered test sample, indicating that sulphides have been completely precipitated. In a similar manner, carbonates and ferrocyanides are then precipitated with solutions of calcium nitrate and zinc nitrate, respectively. After standing for a few hours, the solution is filtered until perfectly clear to remove the combined precipitates. Sufficient nitric acid is then added to make the solution slightly acid to litmus paper. The lead sulphocyanide is then precipitated by the addition of a quantity of lead nitrate, chemically equivalent to the amount of sodium sulphocyanide present. The lead nitrate is in the form of a 20–30% solution which previously has been clarified by filtration. The precipitated lead sulphocyanide is then filtered off, washed until substantially free from nitrates, and dried at a temperature of 115–150° F.

At all stages of the process subsequent to the precipitation of impurities, the material in process should not be allowed to come in contact with materials such as iron or copper which cause discoloration of the product. I have found that process equipment constructed of substantially iron-free ceramic materials is satisfactory in this respect.

The lead sulphocyanide manufactured by the process of my invention is of a very high degree of purity, ranging from 99.3% to 99.7% $Pb(SCN)_2$ content, and is pure white to light cream in color.

Many variations may be introduced into the process described above with the attainment of substantially the same results. Various metallic salts other than those mentioned may be employed for the precipitation of the impurities in the alkali metal or ammonium sulphocyanide solution. Salts of those metals whose respective sulphides, carbonates or ferrocyanides are substantially insoluble in the solutions to be purified are adapted to be used as purifying agents. For example, I have found that sulphides may satisfactorily be removed with lead carbonate or with lead sulphocyanide; that carbonates may be removed with salts of calcium, barium or lead; and that ferrocyanides may be precipitated with ferric salts. It will be obvious that when one or more of the impurities mentioned are absent, the corresponding treatment for the removal of said impurity or impurities may be omitted from the process.

My invention provides a novel and convenient method for preparing lead sulphocyanide of a very high quality which uniformly meets all specifications of the users thereof. Furthermore, according to my process such relatively inexpensive materials as commercial grades of sodium cyanide and sulphur may be utilized as raw materials, whereby substantial savings in production costs are achieved.

In the appended claims the term "alkali metal sulphocyanide" is used to include ammonium sulphocyanide.

I claim:

1. A process for making lead sulphocyanide which comprises treating an alkali metal sulphocyanide solution containing ferrocyanides with a compound of a metal whose ferrocyanide is substantially insoluble; separating the precipitated insoluble metal ferrocyanide from the alkali metal sulphocyanide solution and reacting said solution with a salt of lead.

2. A process for making lead sulphocyanide which comprises treating an alkali metal sulphocyanide solution containing sulphides and ferrocyanides with compounds of metals whose respective sulphides and ferrocyanides are substantially insoluble; separating the precipitated insoluble metal sulphides and ferrocyanides from the said alkali metal sulphocyanide solution and reacting the latter with a salt of lead.

3. A process for making lead sulphocyanide which comprises treating an alkali metal sulphocyanide solution containing sulphides, carbonates and ferrocyanides with compounds of metals whose respective sulphides, carbonates and ferrocyanides are substantially insoluble; separating the precipitated insoluble metal sulphides, carbonates and ferrocyanides from the said alkali metal sulphocyanide solution and reacting the latter with a salt of lead.

4. A process for making lead sulphocyanide which comprises treating a sodium sulphocyanide solution containing ferrocyanides with a compound of a metal whose ferrocyanide is substantially insoluble; separating the precipitated insoluble metal ferrocyanide from the sodium sulphocyanide solution and reacting said solution with a salt of lead.

5. A process for making lead sulphocyanide which comprises treating a sodium sulphocyanide solution containing as impurities, sulphides, ferrocyanides and carbonates with solutions of lead nitrate, calcium nitrate and zinc nitrate in amounts sufficient to precipitate said impurities; separating the precipitated lead sulphide, calcium carbonate and zinc ferrocyanide from said sodium sulphocyanide solution and reacting the latter with a solution of lead nitrate.

6. A process for making lead sulphocyanide which comprises making an alkali metal sulphocyanide solution by reacting an alkali metal cyanide solution with sulphur, treating said alkali metal sulphocyanide solution with a compound of a metal whose ferrocyanide is substantially insoluble, separating the precipitated metal ferrocyanide from the alkali metal sulphocyanide solution and reacting the latter with a salt of lead.

7. A process for making lead sulphocyanide which comprises making an alkali metal sulphocyanide solution by reacting an alkali metal cyanide solution with sulphur, treating said alkali metal sulphocyanide solution with compounds of metals whose respective sulphides and ferrocyanides are substantially insoluble, separating the precipitated metal sulphides and ferrocyanides from the said alkali metal sulphocyanide solution and reacting the latter with a salt of lead.

8. A process for making lead sulphocyanide which comprises making an alkali metal sulphocyanide solution by reacting an alkali metal cyanide solution with sulphur, treating said alkali metal sulphocyanide solution with compounds of metals whose respective sulphides, carbonates and ferrocyanides are substantially insoluble, separating the precipitated metal sulphides, carbonates and ferrocyanides from the said alkali metal sulphocyanide solution and reacting the latter with a salt of lead.

9. A process for making lead sulphocyanide which comprises making a sodium sulphocyanide solution by reacting a sodium cyanide solution with sulphur, treating said sodium sulphocyanide solution with solutions of lead nitrate, calcium nitrate and zinc nitrate, separating the precipitated lead sulphide, calcium carbonate and zinc ferrocyanide from said sodium sulphocyanide solution and reacting the latter with a solution of lead nitrate.

CHARLES ROBERTS HARRIS.